United States Patent
Hirata et al.

(10) Patent No.: US 10,425,024 B2
(45) Date of Patent: Sep. 24, 2019

(54) BRUSHLESS MOTOR DEVICE, IMAGE FORMING APPARATUS, AND CONTROL METHOD FOR CONTROLLING BRUSHLESS MOTOR

(71) Applicant: BROTHER KOGYO KABUSHIKI KAISHA, Nagoya-shi, Aichi-ken (JP)

(72) Inventors: Hironori Hirata, Nagoya (JP); Kohei Kanehara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/936,263

(22) Filed: Mar. 26, 2018

(65) Prior Publication Data

US 2018/0294753 A1    Oct. 11, 2018

(30) Foreign Application Priority Data

Mar. 31, 2017   (JP) ................... 2017-069604

(51) Int. Cl.
*H02P 6/18*        (2016.01)
*B41J 2/45*        (2006.01)
(Continued)

(52) U.S. Cl.
CPC ............. *H02P 6/181* (2013.01); *B41J 2/451* (2013.01); *H02P 6/08* (2013.01); *H02P 6/157* (2016.02); *H02P 6/20* (2013.01)

(58) Field of Classification Search
CPC ...... H02P 1/00; H02P 1/04; H02P 1/12; H02P 1/24; H02P 1/163; H02P 1/26; H02P 1/265; H02P 1/38; H02P 1/46; H02P 1/48; H02P 3/00; H02P 6/00; H02P 6/06; H02P 6/085; H02P 6/12; H02P 6/182; H02P 6/16; H02P 6/185; H02P 6/08; H02P 6/20; H02P 27/08; H02P 11/06; H02P 21/00; H02P 23/00;
(Continued)

(56) References Cited

U.S. PATENT DOCUMENTS 6,396,225 B1 * 5/2002 Wakui ............... H02P 6/085
                                                                        318/400.01
6,512,341 B2 * 1/2003 Matsushiro ........ H02P 6/085
                                                                        318/400.01
(Continued)

FOREIGN PATENT DOCUMENTS

JP    2005-086944 A    3/2005
JP    2015-152802 A    8/2015

*Primary Examiner* — Antony M Paul
(74) *Attorney, Agent, or Firm* — Merchant & Gould P.C.

(57) ABSTRACT

A brushless motor device including: a rotor; a stator including a first coil, a second coil and a third coil, first ends of which are Y-connected to each other; a motor driver including an inverter circuit including switching elements and configured to: switch ON and OFF states of each switching element of the inverter circuit, wherein by switching the ON and OFF states of each switching element of the inverter circuit, the motor driver is configured to switch an energization time period from a first time period in which current is caused to flow from the first coil to the third coil to a second time period in which current is caused to flow from the second coil to the third coil and set both voltages of second ends of the second coil and the third coil to a power supply voltage during the second time period.

13 Claims, 14 Drawing Sheets

(51) Int. Cl.
*H02P 6/08* (2016.01)
*H02P 6/20* (2016.01)
*H02P 6/15* (2016.01)

(58) Field of Classification Search
CPC .... H02P 21/0035; H02P 21/146; H02P 27/00; H02P 27/04; G05B 11/28
USPC ..... 318/400.01, 400.02, 700, 701, 727, 799, 318/800, 801, 430, 437
See application file for complete search history.

(56) References Cited

U.S. PATENT DOCUMENTS

| | | | |
|---|---|---|---|
| 7,847,498 B2 * | 12/2010 | Shibuya | H02P 6/185 318/400.01 |
| 2013/0285586 A1 * | 10/2013 | Koda | H02P 6/18 318/400.35 |
| 2015/0236627 A1 | 8/2015 | Hirata | |

* cited by examiner

BRUSHLESS MOTOR DEVICE, IMAGE FORMING APPARATUS, AND CONTROL METHOD FOR CONTROLLING BRUSHLESS MOTOR

CROSS-REFERENCE TO RELATED APPLICATIONS

This application claims priority from Japanese Patent Application No. 2017-069604 filed on Mar. 31, 2017, the entire contents of which are incorporated herein by reference.

TECHNICAL FIELD

The present disclosure relates to a brushless motor device, an image forming apparatus, and a control method for controlling a brushless motor.

As a technology of a brushless motor device, a technology of performing energization switching of a coil by using an induced voltage generated in the coil of each phase without using a Hall element has been known. For example, related art discloses a configuration of detecting a cross point of an induced voltage and a threshold value and performing energization switching of a coil based on detection timing of the cross point. Also, related art discloses a problem that it becomes difficult to detect the cross point due to a counter-electromotive voltage associated with the energization switching of the coil.

SUMMARY

According to an aspect of the present disclosure, there is provided a brushless motor device including: a brushless motor including: a rotor having a magnetic pole; a stator including a first coil, a second coil and a third coil, first ends of the first coil, the second coil, and the third coil being Y-connected to each other; and a motor driver configured to drive the brushless motor, the motor driver including an inverter circuit including: first switching elements respectively arranged between second ends of the first coil, the second coil, and the third coil and a power supply voltage; and second switching elements respectively arranged between the second ends of the first coil, the second coil, and the third coil and a ground voltage; and wherein the motor driver is configured to switch ON and OFF states of each switching element of the inverter circuit, wherein by switching the ON and OFF states of each switching element of the inverter circuit, the motor driver is configured to switch an energization time period from a first time period in which current is caused to flow from the first coil to the third coil to a second time period in which current is caused to flow from the second coil to the third coil, and the motor driver is configured to set both voltages of the second ends of the second coil and the third coil to the power supply voltage during the second time period.

A control method for implementing the functions of the above device, a computer program and a computer-readable storage medium having the computer program stored therein are also novel and useful.

DETAILED DESCRIPTION

Hereinafter, a first aspect of implementing the image forming apparatus of the present disclosure will be described with reference to the accompanying drawings. In the first aspect, the present disclosure is applied to a laser printer capable of forming a color image.

Figure 1:
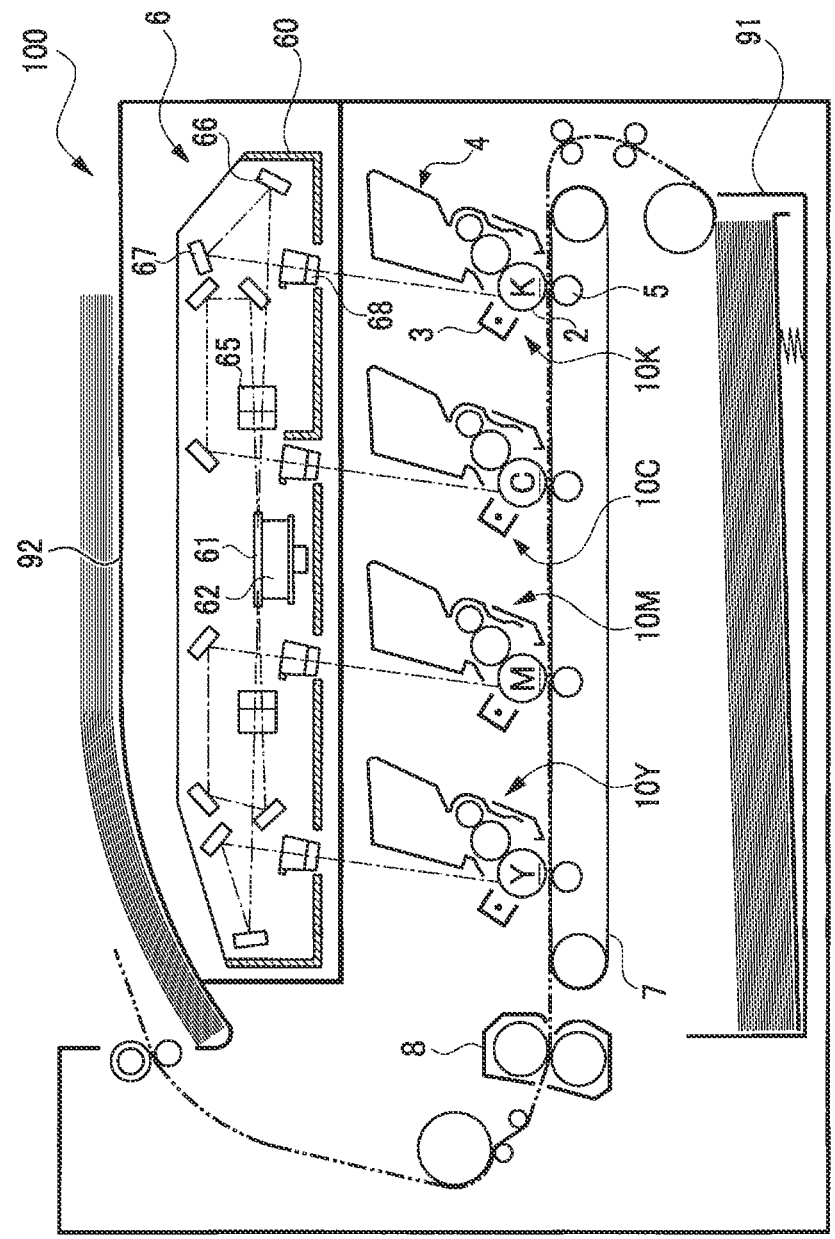
FIG. 1 is a sectional view depicting a schematic configuration of a printer in accordance with an illustrative embodiment.

As schematically shown in FIG. 1, a printer 100 of the first aspect is a so-called tandem-type color laser printer. The printer 100 includes process units 10Y, 10M, 10C, 10K of yellow (Y), magenta (M), cyan (C) and black (K). The process unit 10K includes a photosensitive member 2, a charging unit 3, a developing unit 4, and a transfer unit 5. The process units 10Y, 10M, 10C of the other colors have also the similar configurations. Also, the printer 100 includes an exposure unit 6, which is common to the respective colors and is arranged above the process units of the respective colors. Also, the printer 100 includes a conveyor belt 7, a fixing unit 8, a feeder tray 91, and a sheet discharge tray 92.

First, an overall printing operation of the printer 100 is briefly described. In the below, image formation by the process unit 10K is described. During the printing operation, the printer 100 is configured to charge the photosensitive member 2 by the charging unit 3 and then to expose the same by the exposure unit 6. Thereby, an electrostatic latent image based on image data is formed on a surface of the photosensitive member 2. Also, the printer 100 is configured to develop the electrostatic latent image by the developing unit 4, thereby forming a toner image.

Also, the printer 100 is configured to draw out sheets accommodated in the feeder tray 91 one by one and to convey the same to the conveyor belt 7. While the sheet passes between the photosensitive member 2 and the transfer unit 5, the printer 100 is configured to transfer the toner image on the photosensitive member 2 to the sheet in the transfer unit 5. Also, the printer 100 is configured to fix the toner image on the sheet in the fixing unit 8. The sheet having an image formed thereon in this way is discharged to the sheet discharge tray 92.

In the meantime, in a case of performing a color printing operation, the printer 100 forms toner images of respective colors in the process units 10Y, 10M, 10C of the other colors, and sequentially transfers the toner images to the sheet. Thereby, the toner images are overlapped on the sheet. The overlapped toner images are fixed on the sheet, so that a color image is formed.

Subsequently, a configuration of the exposure unit 6 is described with reference to FIGS. 1 and 2. The exposure unit 6 includes a housing 60, a laser diode 63 configured to emit a laser light, and a variety of optical members for irradiating the laser light emitted from the laser diode 63 toward the photosensitive member 2. As the variety of optical members, the printer 100 includes a polygon mirror 61, a coupling lens 64, an fθ lens 65, a turning back mirror 66, a turning back mirror 67, and a toric lens 68, for example. Also, the printer 100 includes a brushless motor 62 for rotating the polygon mirror 61. The brushless motor 62 will be described later in detail. The laser diode 63 is an example of the light source, and the polygon mirror 61 is an example of the mirror.

Figure 2:
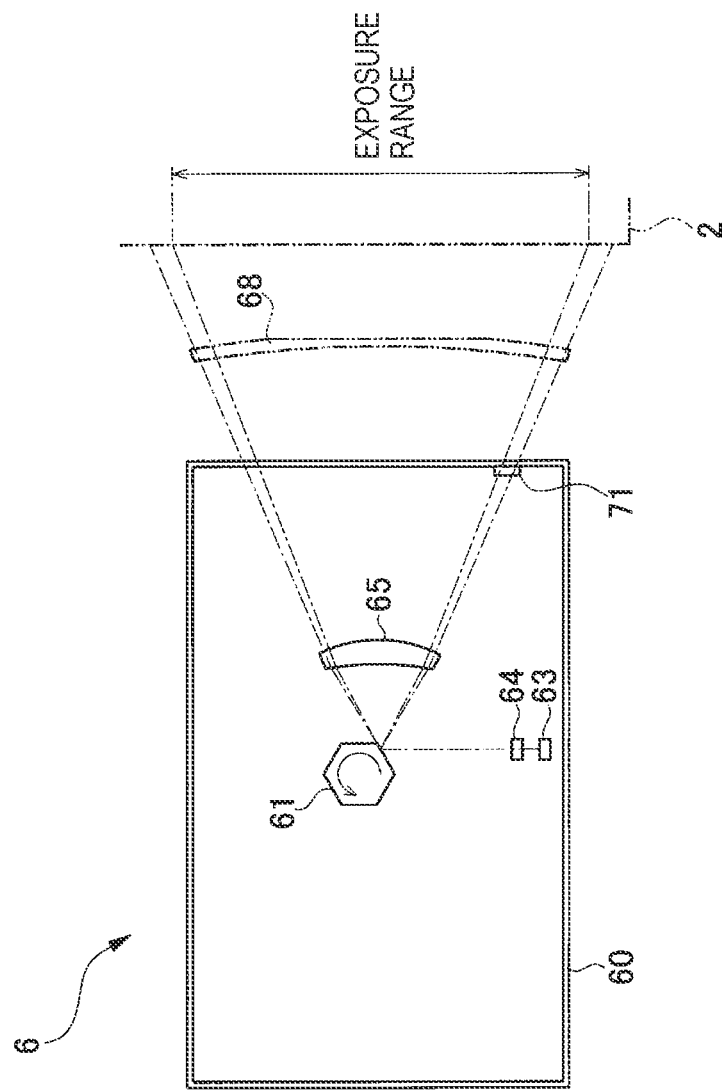
FIG. 2 illustrates a schematic configuration of an exposure unit.

In FIG. 2, only a part, which relates to the process unit 10K of black, of the exposure unit 6 is virtually shown, as seen from the upper of FIG. 1, without turning back a light path behind the turning back mirrors 66, 67. Also, a virtual position of the photosensitive member 2 is shown at the right end of FIG. 2.

As shown in FIG. 2, in the exposure unit 6, the laser light emitted from the laser diode 63 is converted into a light beam via the coupling lens 64, which is then incident on the polygon mirror 61. The polygon mirror 61 has a regular hexagonal shape, as seen from above, and is configured to rotate at constant high speed by the brushless motor 62 and to reflect the light beam during the image formation. The light beam is deflected in association with the rotation of the polygon mirror 61 and is scanned upward from the lower in FIG. 2.

As shown in FIG. 1, the light beam reflected on the polygon mirror 61 is irradiated to the photosensitive member 2 via the fθ lens 65, the turning back mirrors 66, 67, and the toric lens 68. That is, one line part of the photosensitive member 2 is axially exposed by the light beam reflected on one plane of the polygon mirror 61, so that an electrostatic latent image of one line part is formed. A range in which the photosensitive member 2 can be axially exposed, i.e., an image formation range in which an image is to be formed is denoted as an exposure range in FIG. 2.

Also, as shown in FIG. 2, the printer 100 includes a BD (Beam Detect) sensor 71 provided on an inner wall surface of the housing 60 of the exposure unit 6. The BD sensor 71 is configured to receive the laser light reflected on the polygon mirror 61 and to output BD signals of which output values are different depending on whether the laser light is received. The BD signal is used to determine writing timing of each scan line by the laser light, for example. Also, the printer 100 can acquire a rotation speed of the brushless motor 62, based on timing at which the BD signal is received.

Figure 3:
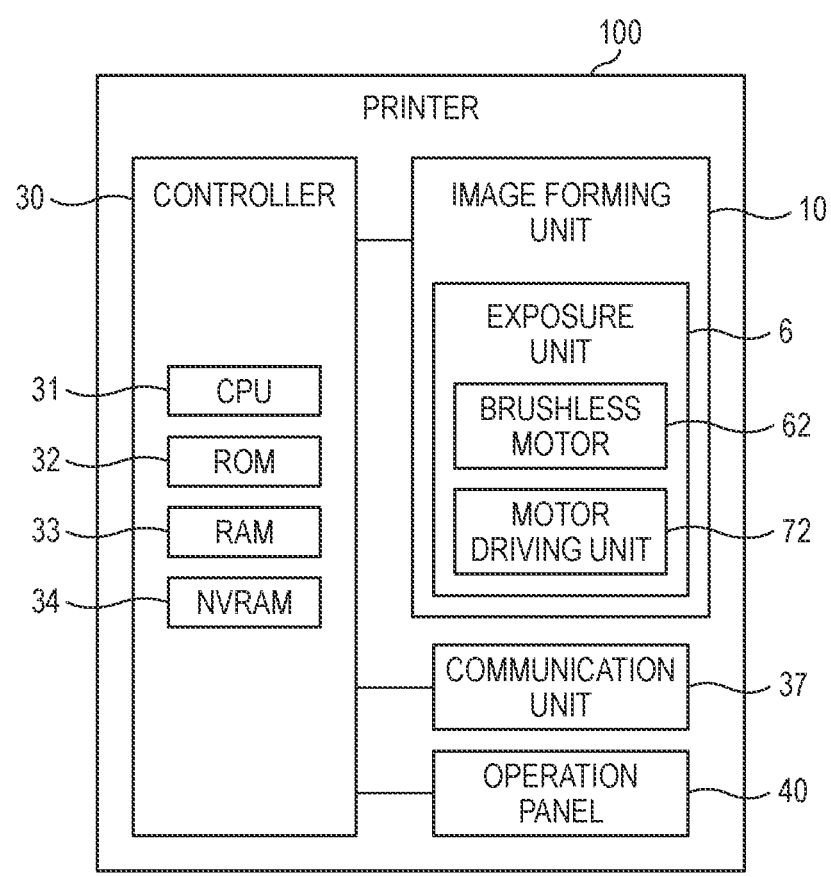
FIG. 3 is a block diagram depicting an electrical configuration of the printer.

Subsequently, an electrical configuration of the printer 100 is described. As shown in FIG. 3, the printer 100 has a controller 30 including a CPU 31, a ROM 32, a RAM 33, and an NVRAM (non-volatile RAM) 34. Also, the printer 100 includes an image forming unit 10, a communication unit 37, and an operation panel 40, which are electrically connected to the controller 30. The exposure unit 6 of the image forming unit 10 includes the brushless motor 62, and a motor driving unit 72 configured to control rotation of the brushless motor 62. The motor driving unit 72 will be described later in detail.

In the ROM 32, a variety of control programs for controlling the printer 100, a variety of settings, an initial value and the like are stored. The RAM 33 is used as a work area to which the diverse programs are read or as a storage area in which data is temporarily stored. The NVRAM 34 is used as a storage area in which image data and diverse setting values are stored.

The CPU 31 is configured to store a processing result in the RAM 33 or the NVRAM 34 and to control the respective constitutional elements of the printer 100, in response to the control program read out from the ROM 32. The CPU 31 is an example of the control device. The controller 30 may be an example of the control device. Also, the motor driving unit 72 may be an example of the control device. In the meantime, the controller 30 in FIG. 3 is a collective term of hardware such as the CPU 31 that is used for controlling the printer 100, and it does not necessarily mean that the controller 30 indicates single hardware actually existing in the printer 100.

The communication unit 37 is hardware for performing communication with an apparatus connected to the printer 100 via a network and the like. The operation panel 40 is hardware configured to display a notification to a user, and to receive a user's instruction input.

Figure 4:
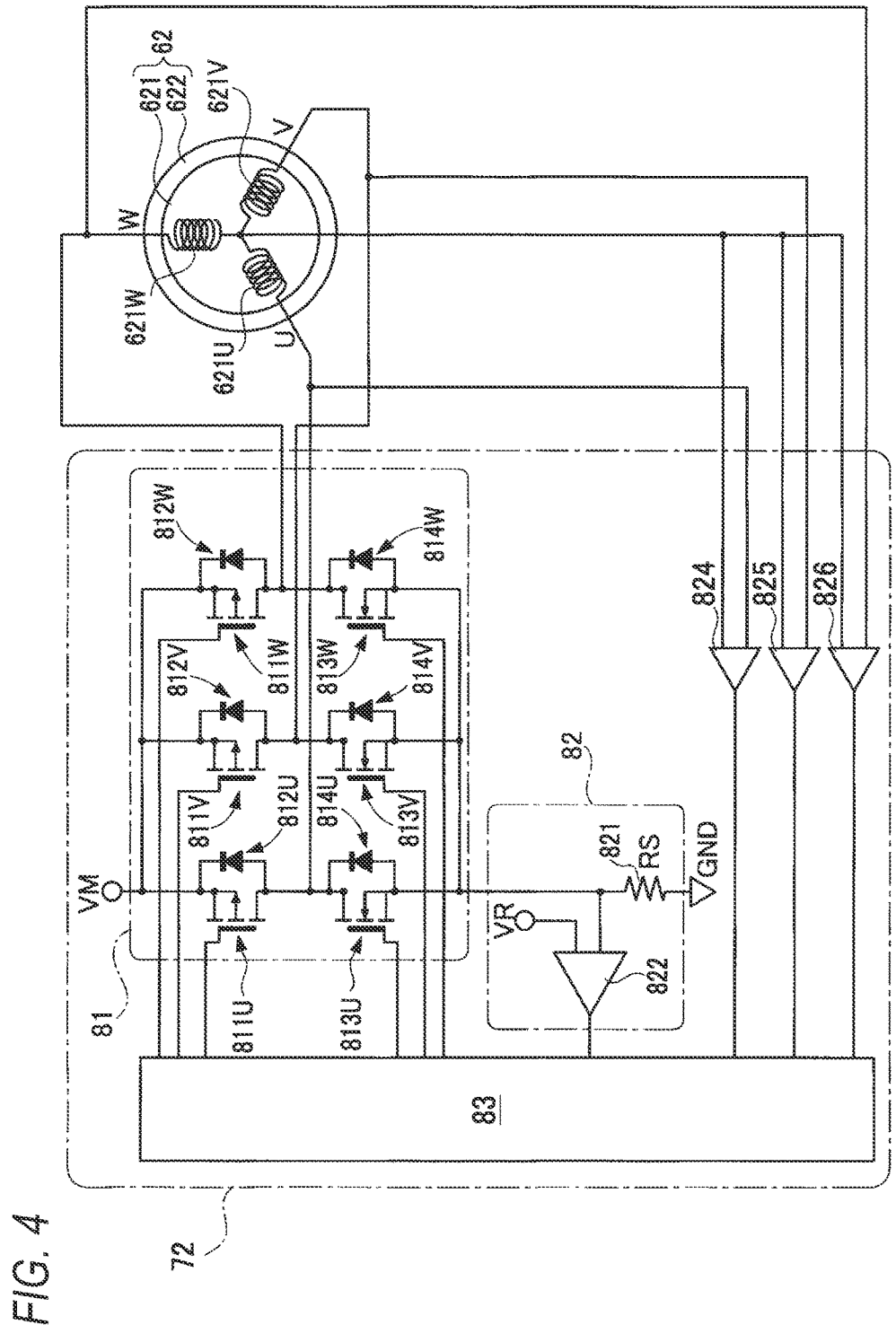
FIG. 4 is a pictorial view depicting configurations of a brushless motor and a motor driving unit.

Subsequently, the rotative driving of the brushless motor 62 is described. As shown in FIG. 4, the brushless motor 62 includes a stator 621 in which Y-connected coils of three phases are arranged, and a rotor 622 in which a plurality of permanent magnets is arranged. The stator 621 includes a U-phase coil 621U, a V-phase coil 621V and a W-phase coil 621W of which one ends are connected to each other at a neutral point. The polygon mirror 61 of the exposure unit 6 is attached to the rotor 622 of the brushless motor 62, and is configured to rotate integrally with the rotor 622.

The printer 100 includes the motor driving unit 72 configured to drive the brushless motor 62. As shown in FIG. 4, the motor driving unit 72 includes an inverter circuit 81 configured to selectively apply a voltage to the coils 621U, 621V, 621W of respective phases of the stator 621, a current measurement unit 82, a comparator 824, a comparator 825, a comparator 826, and a control circuit 83 configured to drive the inverter circuit 81.

As shown in FIG. 4, the inverter circuit 81 has six switching elements 811U, 811V, 811W, 813U, 813V, 813W, and six freewheeling diodes 812U, 812V, 812W, 814U, 814V, 814W. In the below, suffixes for discriminating U, V and W phases are omitted if the discrimination is not required.

The other ends, which are not one ends connected to the neutral point, of the coils of respective phases of the stator 621 are respectively connected with the High-side switching element 811 and the Low-side switching element 813. The High-side switching element 811 is arranged between the other end of each coil of the stator 621 and a power supply voltage (VM). The Low-side switching element 813 is arranged between the other end of each coil of the stator 621 and a ground voltage (GND). Each freewheeling diode 812 is connected in parallel with the corresponding switching element 811. Each freewheeling diode 814 is connected in parallel with the corresponding switching element 813.

The current measurement unit 82 is arranged between the inverter circuit 81 and the GND. That is, the current measurement unit 82 is arranged between a GND-side terminal of the Low-side switching element 813 of each phase of the inverter circuit 81 and the GND. Also, the current measurement unit 82 includes a reference resistance (RS) 821 and a comparator 822. The comparator 822 is configured to compare a reference voltage (VR) and a voltage to be applied to the RS 821 and to transmit a signal corresponding to a current value flowing through the RS 821 to the control circuit 83.

Figure 5:
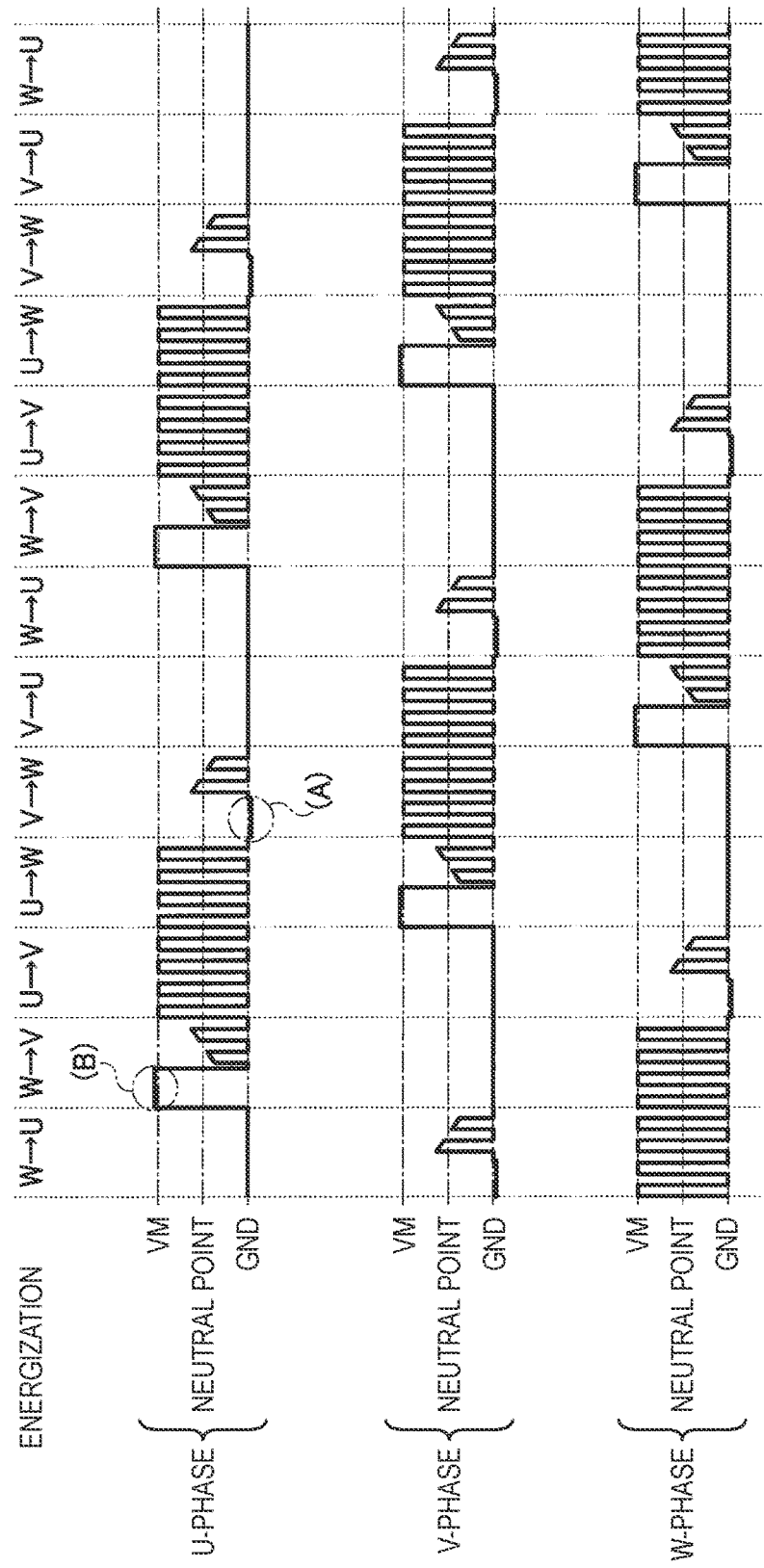
FIG. 5 is a waveform view depicting an example of an induced voltage that is generated in a coil of the brushless motor.

The motor driving unit 72 of the printer 100 is configured to execute switching processing of switching ON and OFF states of the six switching elements 811, 813 of the inverter circuit 81 and driving the brushless motor 62 in a 120° energization manner. As a result, as shown in FIG. 5, for each coil of the stator 621, an energization state in which an applying time period of a positive voltage of an electric angle 120°, a non-energization time period of an electric angle 60°, an applying time period of a negative voltage of an electric angle 120° and a non-energization time period of an electric angle 60° configure one period is repeated. In the meantime, the motor driving unit 72 is configured to control a voltage, which is to be applied for the applying time period of the positive voltage, by PWM control.

Specifically, as shown in FIG. 5, the motor driving unit 72 sequentially switches the energization time period. In FIG. 5, for example, U→W indicates an energization state in which the U-phase is in an applying time period of a positive voltage, the W-phase is in an applying time period of a negative voltage and current flows from the U-phase toward the W-phase. The positive side (high voltage side) is switched in order of U-phase→V-phase→W-phase, and the negative side (low voltage side) is switched in order of U-phase→V-phase→W-phase at intermediate timing of the phase switching timing of the positive side.

The motor driving unit 72 is configured to detect a position of the rotor 622 without using a position detection element such as a Hall element. When the rotor 622 rotates, a magnet of an S-pole and a magnet of an N-pole of the rotor 622 alternately come close to each coil configuring the stator 621. Accompanied by this, a magnetic flux in the coil changes, and an induced voltage is generated in the coil. The induced voltage exhibits a waveform periodically changing to different levels between the cases where the S-pole comes close to the coil and the N-pole comes close to the coil. Therefore, it is possible to detect a position of the rotor 622, i.e., a polarity of the magnet approaching to each coil of the stator 621 by detecting the induced voltage.

The motor driving unit 72 is configured to compare an induced voltage, which is generated in the coil, and a voltage of the neutral point of Y-connection based on the comparators 824, 825, 826, and to switch the energization state to each coil of the stator 621 based on a result of the comparison, for the non-energization time period of each coil of the stator 621. For this reason, as shown in FIG. 4, the motor driving unit 72 is provided with the comparators 824, 825, 826. That is, the control circuit 83 is configured to switch the coil, which is an energization target, based on timing at which the output signals from the comparators 824, 825, 826 are inverted, i.e., timing at which the induced voltage reaches the voltage of the neutral point. In the meantime, the timing at which the output signal from the comparator 824 is inverted corresponds to timing at which the induced voltage generated in the U-phase increases and intersects with the voltage of the neutral point or timing at which the induced voltage generated in the U-phase decreases and intersects with the voltage of the neutral point, for example.

Also, the motor driving unit 72 is configured to acquire a rotation speed of the brushless motor 62, based on a period of a cross point at which the induced voltage and the voltage of the neutral point intersect with each other, i.e., an inversion period of each output signal from the comparator 824, 825, 826. The motor driving unit 72 is configured to change a duty ratio of the PWM control during the applying time period of the positive voltage to each coil of the stator 621, as rotation speed control of the brushless motor 62. Specifically, the motor driving unit 72 is configured to acquire the rotation speed of the brushless motor 62 and to compare the same with a target speed. As a result, in a case where acceleration is performed, the motor driving unit 72 increases the duty ratio, and in a case where deceleration is performed, the motor driving unit 72 decreases the duty ratio. Thereby, the motor driving unit 72 accelerates or decelerates the brushless motor 62 to control the rotation speed of the brushless motor 62 to be a target rotation speed.

In the meantime, as described above, the motor driving unit 72 may be configured to acquire the rotation speed of the brushless motor 62, based on the BD signal. In a case where the rotation speed of the brushless motor 62 is in a low speed region, the motor driving unit 72 acquires the rotation speed based on a period of the cross point, and in a case where the rotation speed of the brushless motor 62 is in a high speed region, the motor driving unit 72 acquires the rotation speed based on the BD signal. The reason is that a scanning speed of the light beam is slow in the low speed region, so that if the rotation speed control is performed based on the BD signal, the photosensitive member 2 is irradiated for a long time. If the rotation speed control based on the BD signal is repeated in the low speed region, the photosensitive member 2 may be deteriorated. Therefore, it is preferable to acquire the rotation speed based on the period of the cross point, in the low speed region.

In the brushless motor 62, after switching the energization state, a counter-electromotive voltage attributable to each coil of the stator 621 is generated. In a case where any phase is switched from the applying time period of the positive voltage to the non-energization time period, for example, in the U-phase immediately after the switching from U→W to V→W, a counter-electromotive voltage of a voltage lower than the GND is generated, as shown in (A) of FIG. 5. Hereinafter, this counter-electromotive voltage is referred to as counter-electromotive voltage (A), and a time period in which the counter-electromotive voltage (A) is generated is referred to as counter-electromotive time period (A). The counter-electromotive time period (A) is a time period in which current (regenerative current (A)) to flow back through the Low-side freewheeling diode 814 is generated by the counter-electromotive voltage (A) generated in the coil of the switched phase (for example, the U-phase coil 621U).

Also, in a case where any phase is switched from the applying time period of the negative voltage to the non-energization time period, for example, in the U-phase immediately after the switching from W→U to W→V, a counter-electromotive voltage of a voltage higher than the VM is generated, as shown in (B) of FIG. 5. Hereinafter, this counter-electromotive voltage is referred to as counter-electromotive voltage (B), and a time period in which the counter-electromotive voltage (B) is generated is referred to as counter-electromotive time period (B). The counter-electromotive time period (B) is a time period in which current (regenerative current (B)) to flow back through the High-side freewheeling diode 812 is generated by the counter-electromotive voltage (B) generated in the coil of the switched phase (for example, the U-phase coil 621U).

The counter-electromotive time period (A) or the counter-electromotive time period (B) is time from the start of the non-energization time period until the counter-electromotive voltage becomes zero, and is a time period in which it is not possible to appropriately acquire the cross point because it is not possible to normally detect the induced voltage. For this reason, the motor driving unit 72 is configured to set the time period, in which the counter-electromotive voltage is generated, as a mask time period in which the induced voltage and the voltage of the neutral point are not compared. The printer 100 is configured to compare the induced voltage and the voltage of the neutral point for a time period except the mask time period, and to perform the rotation control of the brushless motor 62, based on a result of the comparison.

That is, the motor driving unit 72 is configured not to compare the induced voltage and the voltage of the neutral point for the counter-electromotive time period (A) or the counter-electromotive time period (B). When the timing at which the induced voltage reaches the voltage of the neutral point is in the counter-electromotive time period (A) or the counter-electromotive time period (B), the motor driving unit 72 cannot appropriately acquire the cross point.

A time period after the phase switching until the induced voltage reaches the voltage of the neutral point is shorter the higher the rotation speed of the brushless motor 62 is. In order to appropriately acquire the cross point even at the high rotation speed, it is preferable that the counter-electromotive time period is short. The counter-electromotive time period is time after the phase switching until the regenerative current becomes zero. Therefore, the printer 100 of the first aspect is configured to perform processing of further increasing a current value of the regenerative current to flow per unit time so as to cause the regenerative current to become zero earlier. To this end, the printer 100 is configured to control a voltage that is to be applied to each coil for the counter-electromotive time period.

Figure 6:
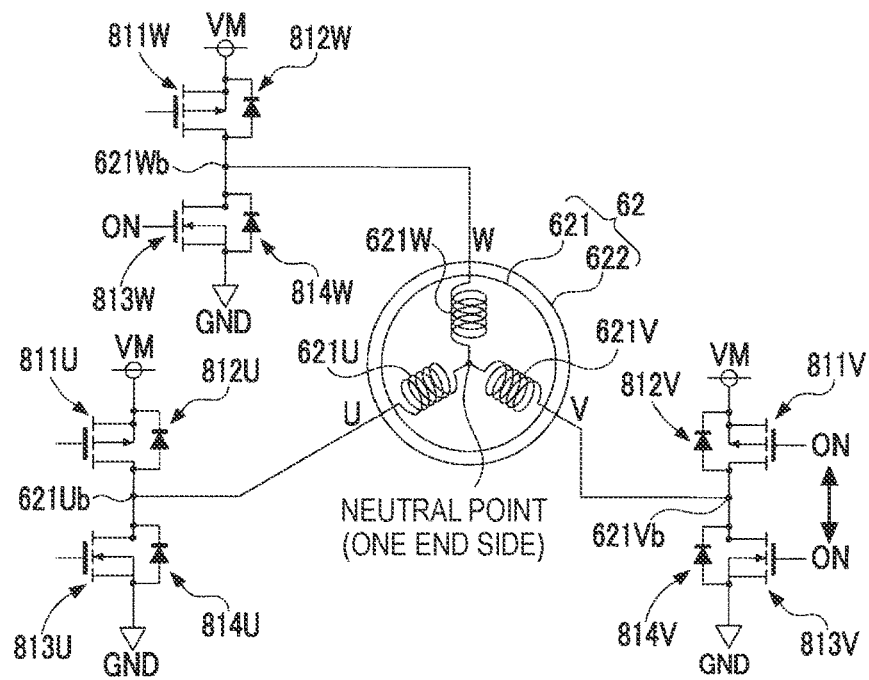
FIG. 6 illustrates an example of a current path.

In a case of applying the positive voltage to the coil, the motor driving unit 72 performs the PWM control of the voltage. Therefore, a voltage of the other end of a coil of a phase to which the positive voltage is being applied, specifically, the VM and the GND alternately repeat. For example, as shown in FIG. 6, for the energization time period of V→W, the switching elements 811U and 813U connected to the other end 621Ub of the U-phase coil 621U are all OFF, the switching element 811W connected to the other end 621Wb of the W-phase coil 621W is OFF but the switching element 813W is ON, and the switching elements 811V and 813V connected to the other end 621Vb of the V-phase coil 621V become ON alternately. Also, for example, at timing at which the V-phase switching element 813V becomes ON, both the W-phase voltage and the V-phase voltage are substantially 0V.

For example, upon switching from U→W to V→W, a magnitude of change in regenerative current to flow back through the U-phase freewheeling diode 814U is proportional to a voltage that is to be applied to the coil 621U. As described above, at the timing at which the W-phase voltage and the V-phase voltage are all substantially 0V, there is no substantial difference between the W-phase or V-phase voltage and the U-phase voltage, and the change in regenerative current from the U-phase is small. When the change in regenerative current is small, the counter-electromotive time period, which is a time period until the regenerative current becomes zero, is long. This phenomenon occurs for the counter-electromotive time period (A). Therefore, in many cases, the counter-electromotive time period (A) is longer than the counter-electromotive time period (B).

Therefore, the motor driving unit 72 of the first aspect is configured to perform an operation of setting voltages of the other ends of the coils of two phases except for a phase, which is in the non-energization time period, to the VM, for the counter-electromotive time period (A). In the below, the corresponding operation is referred to as 'ON operation'. That is, the ON operation is an operation of, when any phase is switched from the applying time period of the positive voltage to the non-energization time period, setting voltages of the other ends, which are not the neutral point-side, of coils of two phases except the switched phase to the VM.

Figure 7:
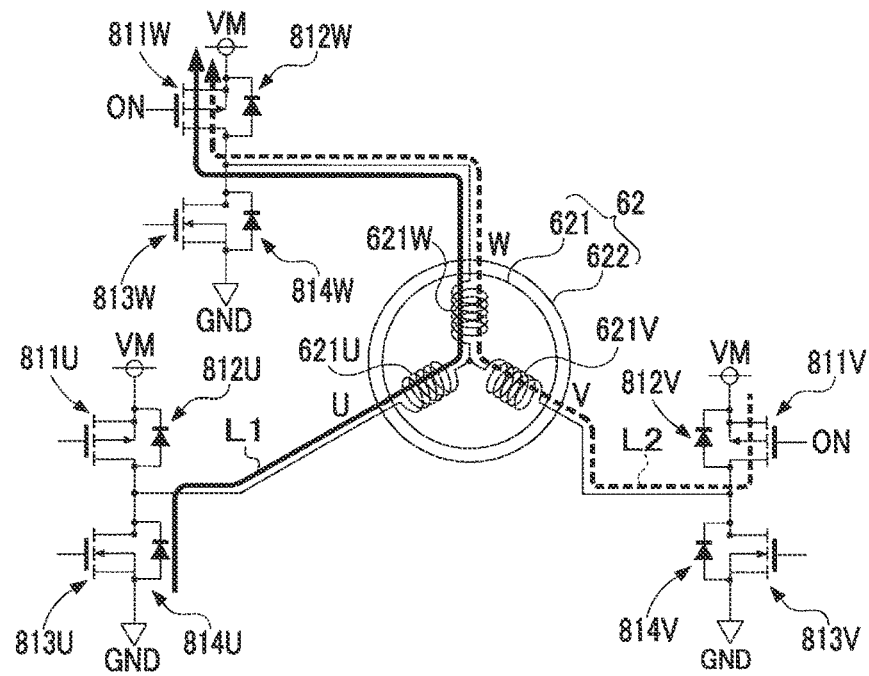
FIG. 7 illustrates an example of the current path.

In the ON operation, for example, upon switching from U→W to V→W, both the High-side switching element 811W of the W-phase and the High-side switching element 811V of the V-phase become ON, as shown in FIG. 7. When the switching element 811W and the switching element 811V become ON, both the W-phase voltage and the V-phase voltage become the VM. On the other hand, since both the switching elements 811U and 813U of the U-phase are off and the U-phase voltage is substantially 0V, a difference between the W-phase voltage or the V-phase voltage and the U-phase voltage is large. When the difference of the voltages is large, a change in regenerative current from the U-phase is large and the counter-electromotive time period becomes shorter. In this case, the voltage that is applied to the U-phase is about ⅔ of the VM.

During the ON operation, as shown with a solid line L1 in FIG. 7, the regenerative current flows from the U-phase freewheeling diode 814U to the W-phase switching element 811W via the coil 621U and the coil 621W. For example, when the V-phase PWM control is stopped to perform the ON operation during the counter-electromotive time period, there is no time period in which the regenerative current little changes, and the regenerative current changes largely. As a result, the regenerative current becomes zero early, and the counter-electromotive time period is shortened. Meanwhile, in this state, as shown with a broken line L2 in FIG. 7, current flowing from the switching element 811V to the switching element 811W via the coil 621V and the coil 621W is also generated.

Figure 8:
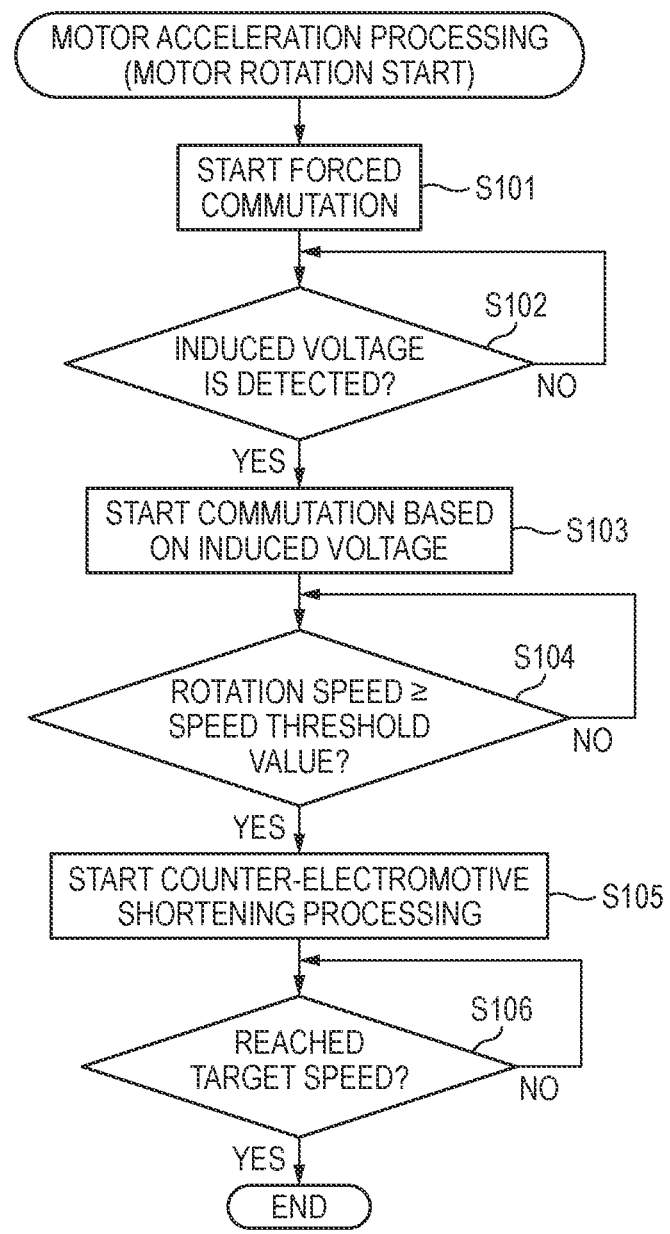
FIG. 8 is a flowchart depicting a sequence of motor acceleration processing.

Subsequently, a sequence of motor acceleration processing of starting rotation of the brushless motor 62 and accelerating the same to a final target speed is described with reference to a flowchart of FIG. 8. The motor acceleration processing is executed by the motor driving unit 72 when the polygon mirror 61 starts to rotate as a printing job is received, for example.

In the motor acceleration processing, the motor driving unit 72 first outputs a predetermined signal from the control circuit 83 to the inverter circuit 81, and performs activation by forced commutation (S101). Then, the motor driving unit 72 determines whether an induced voltage, which is generated by the rotation of the brushless motor 62, is detected (S102). Specifically, the motor driving unit 72 determines whether the generated induced voltage exceeds the voltage of the neutral point and the cross point based on the induced voltage can be acquired. In a case where it is determined that the induced voltage is not detected (S102: NO), the motor driving unit 72 continues the forced commutation.

In a case where it is determined that the induced voltage is detected (S102: YES), the motor driving unit 72 starts commutation control based on the induced voltage (S103). The processing of S103 is an example of the switching of ON and OFF states of each switching element of the inverter circuit. In the commutation control based on the induced voltage, the motor driving unit 72 switches the energization state of the inverter circuit 81, based on timing at which the cross point has been acquired.

Then, the motor driving unit 72 determines whether the rotation speed of the brushless motor 62 is equal to or higher than a predetermined speed threshold value (S104). In a case where it is determined that the rotation speed of the brushless motor 62 is not equal to or greater than the predetermined speed threshold value (S104: NO), the motor driving unit 72 continues the commutation based on the induced voltage. The speed threshold value is a rotation speed at which time after the switching timing of the energization state until the cross point is acquired is substantially equivalent to the counter-electromotive time period. That is, in a case where the rotation speed is slower than the speed threshold value, the counter-electromotive time period is shorter than the time until the cross point is acquired. Therefore, a possibility that the cross point can be appropriately acquired even without the ON operation is high.

In the meantime, during the ON operation, since two phases are set to the power supply voltage, phase current for driving does not flow and the rotation speed of the brushless motor 62 does not increase. Since the motor driving unit 72 of the first aspect does not perform the ON operation at low speed, the starting-up from the low speed is not delayed.

On the other hand, in a case where it is determined that the rotation speed of the brushless motor 62 is equal to or higher than the predetermined speed threshold value (S104: YES), the motor driving unit 72 starts counter-electromotive shortening processing including the ON operation (S105). The counter-electromotive shortening processing is processing of shortening the counter-electromotive time period by performing the ON operation for the counter-electromotive time period. The counter-electromotive shortening processing will be described later in detail. During the high-speed rotation, a ratio of the counter-electromotive time period occupying the non-energization time period is high, so that it is particularly difficult to detect the cross point. For this reason, by performing the counter-electromotive shortening processing in a case where the rotation speed becomes equal to or higher than the speed threshold value, it is possible to easily detect the cross point.

Then, the motor driving unit 72 determines whether the rotation speed of the brushless motor 62 has reached a final target speed (S106). In a case where it is determined that the rotation speed of the brushless motor 62 has not reached the target speed (S106: NO), the motor driving unit 72 continues the rotation control in parallel with the counter-electromotive shortening processing, and further accelerates the brushless motor 62. Then, in a case where it is determined that the rotation speed of the brushless motor 62 has reached the target speed (S106: YES), the motor driving unit 72 ends the motor acceleration processing. Thereafter, the printer 100 executes a printing operation of the received printing job.

In the meantime, the final target speed is a rotation speed of the polygon mirror 61 upon execution of the printing in the printer 100. The motor driving unit 72 acquires the rotation speed based on the cross point until the rotation speed of the brushless motor 62 reaches a predetermined speed faster than the speed threshold value and slower than the final rotation speed, and acquires the rotation speed based on the BD signal at the predetermined speed or higher. For this reason, the motor driving unit 72 performs the determination of S106 by using the rotation speed acquired based on the BD signal.

Subsequently, a sequence of the counter-electromotive shortening processing that starts in S105 of the motor acceleration processing is described with reference to a flowchart of FIGS. 9A and 9B. The counter-electromotive shortening processing is executed by the motor driving unit 72 when the rotation speed of the brushless motor 62 becomes equal to or higher than the predetermined speed threshold value, in the motor acceleration processing. Meanwhile, in FIGS. 9A and 9B, only a sequence when the energization time period is switched from U→W to V→U via V→W is shown. In the below, the sequence for the corresponding time period is described. However, it should be noted that the motor driving unit 72 executes similar processing while switching the phase, even thereafter.

Figure 9A:
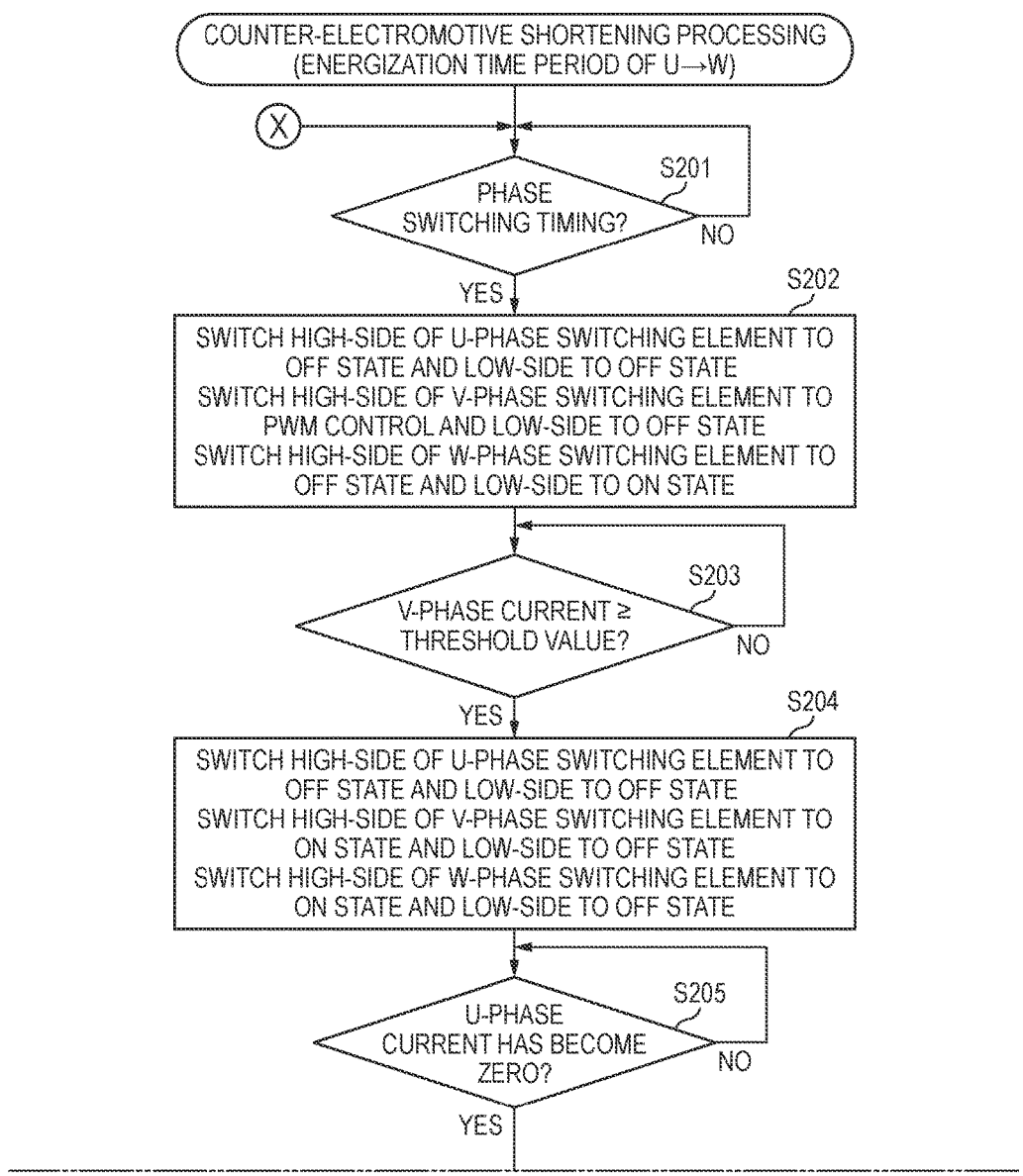
FIGS. 9A and 9B show a flowchart depicting a sequence of counter-electromotive shortening processing of a first aspect.
Figure 9B:
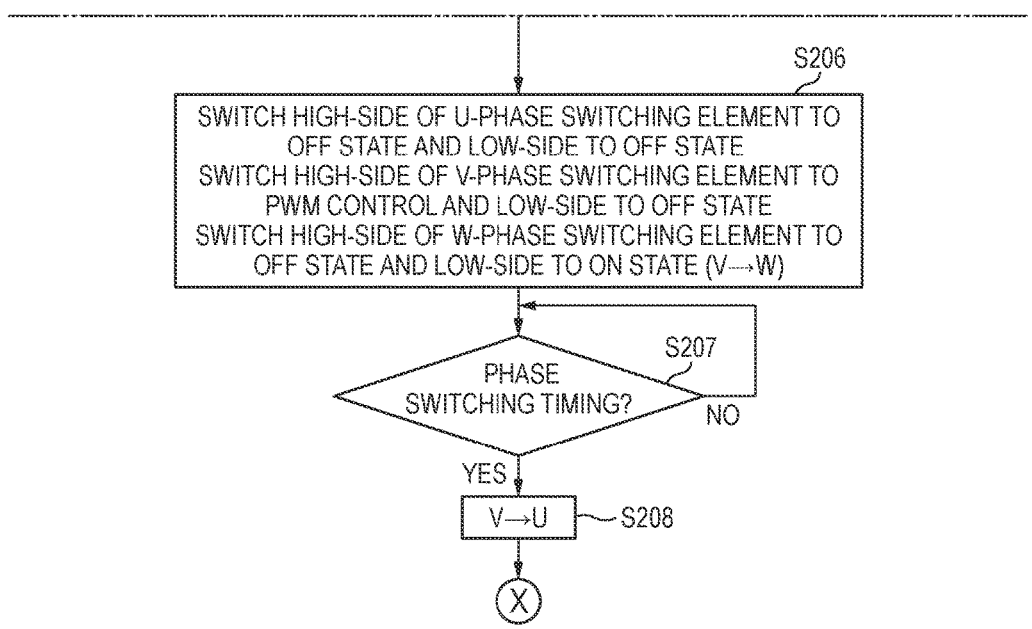

The motor driving unit 72 starts the counter-electromotive shortening processing shown in FIGS. 9A and 9B, in the energization time period of U→W. In the energization time period of U→W upon start of the counter-electromotive shortening processing, the switching elements 811, 813 of respective phases are set as follows.

| U-phase: | High-side switching element 811U | PWM control |
|---|---|---|
| | Low-side switching element 813U | OFF |
| V-phase: | High-side switching element 811V | OFF |
| | Low-side switching element 813V | OFF |
| W-phase: | High-side switching element 811W | OFF |
| | Low-side switching element 813W | ON |

In the counter-electromotive shortening processing, the motor driving unit 72 first determines whether it is phase switching timing (S201). In a case where it is determined that it is not the phase switching timing (S201: NO), the motor driving unit 72 further continues the energization time period of U→W. Then, in a case where it is determined that it is the phase switching (S201: YES), the motor driving unit 72 switches the High-side switching element 811U of U-phase to the off state, and switches the High-side switching element 811V of V-phase to the PWM control (S202).

Thereby, as shown in section t1 of FIG. 10, the switching elements 811, 813 of respective phases are as follows.

| U-phase: | High-side switching element 811U | OFF |
|---|---|---|
| | Low-side switching element 813U | OFF |
| V-phase: | High-side switching element 811V | PWM control |
| | Low-side switching element 813V | OFF |
| W-phase: | High-side switching element 811W | OFF |
| | Low-side switching element 813W | ON |

Figure 10:
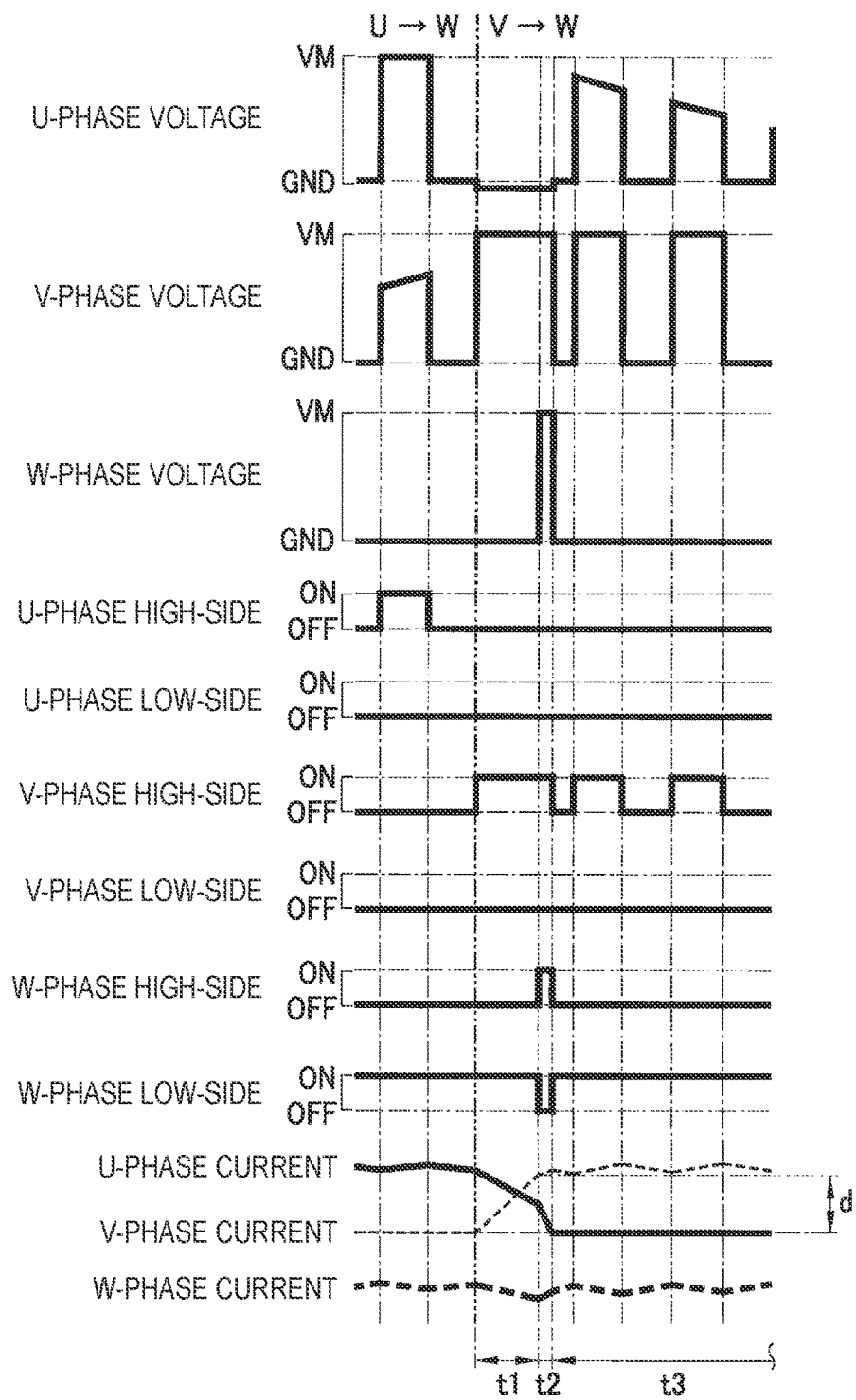
FIG. 10 illustrates voltages of respective phases, switched state of switching elements, and changes in current.
Figure 11:
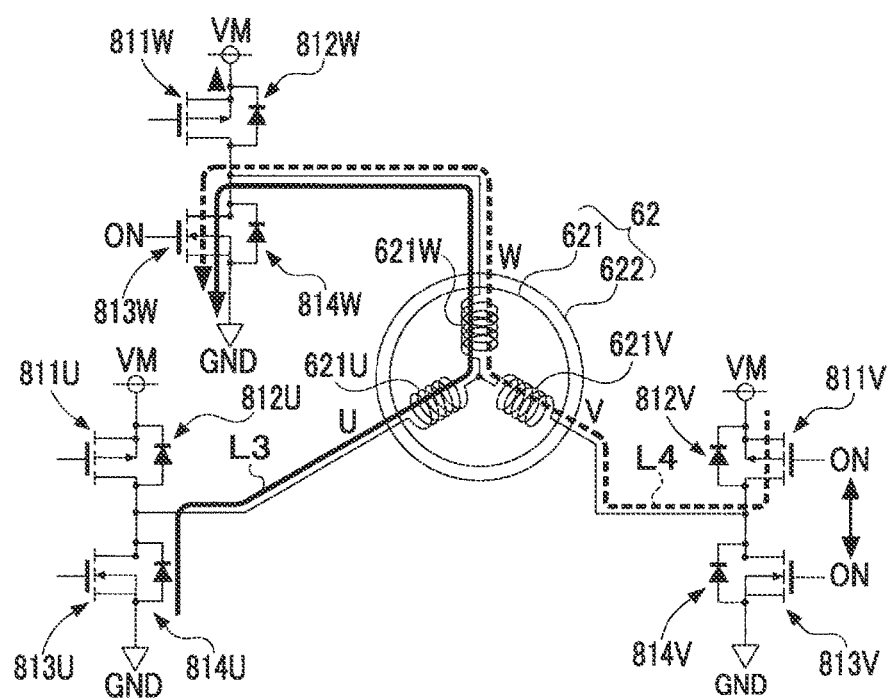
FIG. 11 illustrates an example of the current path.

As shown in FIG. 11, in section t1, U-phase current (line L3), which is regenerative current flowing from the U-phase freewheeling diode 814U to the W-phase switching element 813W via the coil 621U and the coil 621W, and V-phase current (line L4), which flows from the switching element 811V to the switching element 813W via the coil 621V and the coil 621W, are generated. Then, as shown in FIG. 10, a current value of the U-phase current gradually decreases, and a current value of the V-phase current gradually increases. Meanwhile, in FIGS. 10, 12 and 13, a change from a state where the V-phase current value is zero (0) and the positive or negative current flows through the other two phases is shown. That is, the current value is smaller as it is closer to an axis denoted as "V-phase current" and is larger as it is more distant from the axis.

Then, the motor driving unit 72 determines whether the V-phase current becomes equal to or higher than a predetermined threshold value d (refer to FIG. 10), based on the output signal from the current measurement unit 82 (S203). In a case where it is determined that the V-phase current is not equal to or higher than the predetermined threshold value d (S203: NO), the motor driving unit 72 continues the energization at that state. The threshold value d is a current value that is necessary to perform the speed control by the motor driving unit 72. The motor driving unit 72 determines the threshold value d based on the target speed at that time.

For example, when a current upper limit is 2 A, the threshold value d may also be set to 2 A.

In a case where it is determined that the V-phase current becomes equal to or higher than the predetermined threshold value d (S203: YES), the motor driving unit 72 switches the High-side switching element 811W of W-phase to the ON state, and switches the Low-side switching element 813W of W-phase to the OFF state (S204). The processing of S204 is an example of setting both voltages of the second ends of the second coil and the third coil to the power supply voltage during the second time period. That is, the motor driving unit 72 performs the ON operation of setting the other end of the V-phase coil 621V and the other end of the W-phase coil 621W to the power supply voltage VM. In the meantime, the High-side switching element 811V of V-phase may be kept under the PWM control or may be switched to the ON state.

Thereby, as shown in section t2 of FIG. 10, the switching elements 811, 813 of respective phases are as follows.

| U-phase: | High-side switching element 811U | OFF |
| --- | --- | --- |
| | Low-side switching element 813U | OFF |
| V-phase: | High-side switching element 811V | ON |
| | Low-side switching element 813V | OFF |
| W-phase: | High-side switching element 811W | ON |
| | Low-side switching element 813W | OFF |

As shown in FIG. 7, in section t2, U-phase current (line L1), which is regenerative current, flows from the U-phase freewheeling diode 814U to the W-phase switching element 811W, and V-phase current (line L2) flows from the switching element 811V to the switching element 811W. Then, as shown in section t2 of FIG. 10, the U-phase current decreases faster than in section t1, and a degree of increase of the V-phase current is reduced, as compared in section t1. That is, the current value of the regenerative current per unit time in section t2 is larger than in section t1.

Then, the motor driving unit 72 determines whether the U-phase current has become zero (S205). In a case where it is determined that the U-phase current has not become zero (S205: NO), the motor driving unit 72 continues the energization state of S204. On the other hand, in a case where it is determined that the U-phase current has become zero (S205: YES), the motor driving unit 72 switches the inverter circuit 81 for V→W (S206).

In S206, the motor driving unit 72 switches the switching elements 811, 813 of respective phases, as follows. In the meantime, this is the same state as S202.

| U-phase: | High-side switching element 811U | OFF |
| --- | --- | --- |
| | Low-side switching element 813U | OFF |
| V-phase: | High-side switching element 811V | PWM control |
| | Low-side switching element 813V | OFF |
| W-phase: | High-side switching element 811W | OFF |
| | Low-side switching element 813W | ON |

After the U-phase current has become zero, the switching to V→W is performed, so that the phase current flows from the V-phase to the W-phase, as shown in section t3 of FIG. 10. By providing the Section t2, time until the U-phase current becomes zero is short, and as shown in the U-phase voltage of FIG. 10, since the induced voltage changes, it is possible to appropriately acquire the cross point.

In the meantime, the timing of the switching to V→W in S206 is timing at which the regenerative current from the U-phase has become zero, and is also timing at which the counter-electromotive time period by the counter-electromotive voltage generated in the U-phase has ended. The motor driving unit 72 may perform the determination of S205 by directly measuring the current flowing through the U-phase or based on whether the U-phase voltage is equal to or higher than 0V. For example, as shown in the U-phase voltage of FIG. 10, in this case, since the counter-electromotive voltage is a voltage lower than 0V, when the U-phase voltage becomes 0V or higher, it can be determined that the counter-electromotive time period has ended.

Then, the motor driving unit 72 determines whether it is next phase switching timing (S207). In a case where it is determined that it is not the next phase switching timing (S207: NO), the motor driving unit 72 continues the energization in V→W. In a case where it is determined that it is the next phase switching timing (S207: YES), the motor driving unit 72 switches the energization state from V→W to V→U, which is a next energization state (S208).

The phase switching timing from V→W to V→U is determined based on the timing at which the cross point generated by the induced voltage is acquired. The counter-electromotive voltage generated upon this switching is the counter-electromotive voltage (B) (refer to FIG. 5). Since the counter-electromotive time period (B) is shorter than the counter-electromotive time period (A), a possibility that the cross point can be appropriately acquired even without the ON operation is high.

After S208, the motor driving unit 72 returns to S201, and executes similar processing in a sequence in which each phase of the flowchart is changed to a next phase, respectively. That is, the motor driving unit 72 continues to execute the counter-electromotive shortening processing until YES is determined in S106 of the motor acceleration processing while switching the phases to be energized in order of U→V→W.

In the meantime, the similar operation may be executed for the counter-electromotive time period (B), too. That is, during the counter-electromotive time period (B), the other ends of the coils of two phases except for a phase, which is in the non-energization time period, may be set to the GND voltage. This operation is an example of setting both voltages of the second coil and the third coil to the ground voltage during the fourth time period. By doing so, like the ON operation that is performed for the counter-electromotive time period (A), it is possible to shorten the counter-electromotive time period (B).

Figure 12:
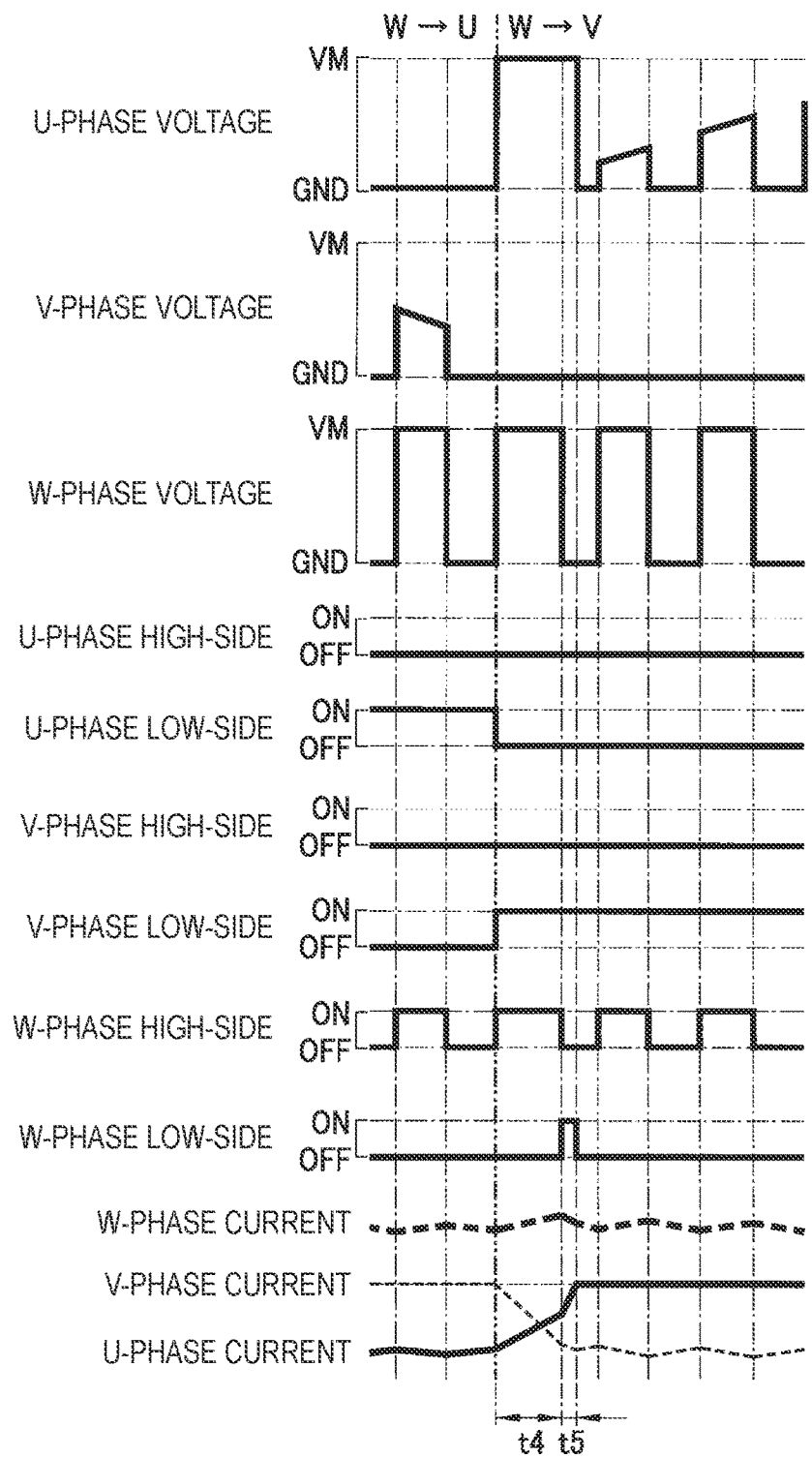
FIG. 12 illustrates voltages of respective phases, switched state of switching elements, and changes in current.

For example, upon the switching from W→U to W→V, the other ends of the V-phase coil 621U and the W-phase coil 621W except for the U-phase, which is in the non-energization time period, are set to the GND. For example, as shown in FIG. 12, after the motor driving unit 72 waits until the current value of the V-phase current becomes the predetermined threshold value or higher (section t4), the motor driving unit 72 switches the High-side switching element 811W of W-phase to the OFF state, and switches the Low-side switching element 813W of W-phase to the ON state (section t5). In the meantime, since the V-phase has been already set to the GND in section t4, the switching is not required with respect to the V-phase.

Also, the motor driving unit 72 may perform the determination of S205 by calculating the timing at which the regenerative current becomes zero. A length of the counter-electromotive time period in a case where the ON operation is not performed may be acquired based on a characteristic value of a coil such as an inductance and a value of current to flow immediately before the counter-electromotive time period. For example, time T of section t2 is calculated (T=3L×(Ia−Ib/2)/2VM) by using a current value Ia immediately before section t1 and a current value Ib (=the threshold value d) upon switching to section t2. In the meantime, L indicates an inductance of a coil.

The above equation is obtained as follows. First, in section t1, a voltage of VM×⅔ is applied to the V-phase. Since the voltage is expressed by a product of an amount of change in current per time and an inductance L, an amount of change in current is 2VM/3L. Therefore, time T1 until the current value becomes Ib is T1=Ib×3L/2VM. In the meantime, since a voltage of VM×⅓ is applied to the U-phase in section t1, an amount of change in current is VM/3L. Since current of T1×VM/3L of the current value Ia immediately before section t1 flows for time T1, a remaining amount of the current upon end of section t1 is Ia−(Ib×3L/2VM)×(VM/3L)=Ia−Ib/2. Also, in section t2, the voltage of VM×⅔ is applied to the U-phase and an amount of change in current is 2VM/3L. Therefore, time T is obtained from a result obtained by dividing the remaining amount of current (Ia−Ib/2) by 2VM/3L.

That is, the motor driving unit 72 calculates time T of section t2 based on the above-described equation, and performs the processing of S204 after YES is determined in S203. Then, when it is determined that time T has elapsed, the motor driving unit 72 may determine YES in S205 and proceed to S206. Also, the motor driving unit 72 may use a table in which time T is stored in association with diverse current values. That is, the motor driving unit 72 may read out time T from the table and perform the similar processing.

As described above, according to the printer 100 of the first aspect, during the counter-electromotive time period (A) upon the switching from U→W to V→W, for example, the ON operation of setting the voltages of the other ends of the V-phase and the W-phase to the VM is performed. For the time period of V→W in which the U-phase is switched from the energization time period of the positive voltage to the non-energization time period, the V-phase and the W-phase are set to the VM, so that there is no potential difference between the V-phase coil 621V and the W-phase coil 621W and both a potential difference between the U-phase coil 621U and the V-phase coil 621V and a potential difference between the U-phase coil 621U and the W-phase coil 621W increase. Accordingly, since the regenerative current can easily flow via the U-phase coil 621U and the W-phase coil 621W, an amount of decrease in regenerative current per unit time increases. As a result, since the counter-electromotive time period, which is a time period until the regenerative current becomes zero, is shortened, it is possible to easily detect the cross point.

Subsequently, a second aspect of implementing the image forming apparatus of the present disclosure is described with reference to the accompanying drawings. The printer 100 of the second aspect is a printer 100 having a configuration similar to the first aspect, and is configured to perform control different from the first aspect. In the below, the same configuration or processing as the first aspect is denoted with the same reference numerals, and the descriptions thereof are omitted.

The motor driving unit 72 of the printer 100 of the second aspect is configured to execute the motor acceleration processing that is similar to the first aspect. Meanwhile, in the printer 100 of the second aspect, the start timing of the ON operation in the counter-electromotive shortening processing is different from the first aspect. In the counter-electromotive shortening processing of the first aspect, after the current value of the phase, which is in the applying time period of the positive voltage after the phase switching, becomes the predetermined threshold value or higher, the ON operation is executed. However, in the counter-electromotive shortening processing of the second aspect, the ON operation is executed without waiting for the change of the current value after the phase switching.

That is, in the counter-electromotive shortening processing of the second aspect, the determinations of S202 and S203 of the counter-electromotive shortening processing of the first aspect (refer to FIGS. 9A and 9B) are omitted. The motor driving unit 72 of the second aspect proceeds to S204 when YES is determined in S201. Also in the second aspect, the processing of S204 is an example of setting both voltages of the second ends of the second coil and the third coil to the power supply voltage during the second time period.

Figure 13:
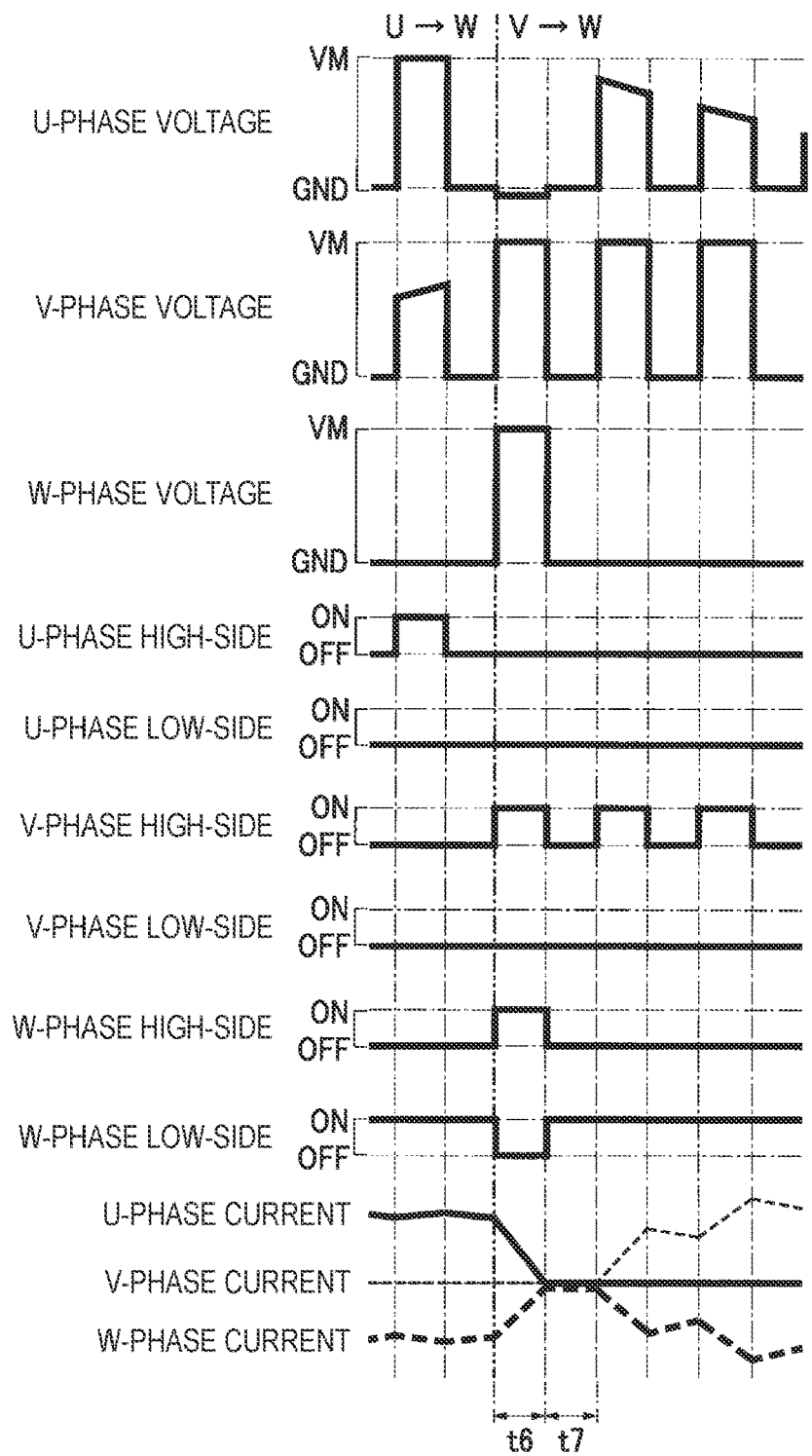
FIG. 13 illustrates voltages of respective phases, switched state of switching elements, and changes in current.

For example, at timing of the phase switching from U→W to V→W, for example, the motor driving unit 72 of the second aspect executes the ON operation from the timing start of the phase switching, irrespective of the current value of the V-phase current. For this reason, for example, as shown in FIG. 13, the U-phase current largely decreases in section t6 immediately after the phase switching. That is, time t6, which is time until the regenerative current becomes zero, is shorter than section (t1+t2) in the first aspect. Accordingly, in the second aspect, it is possible to further shorten the counter-electromotive time period, as compared to the first aspect.

Meanwhile, according to the second aspect, as shown in FIG. 13, in section t6, the W-phase current also decreases and the V-phase current does not increase. That is, immediately after section t7 following section t6 starts, the current value of the W-phase or the V-phase, which is the energization phase, is small, and the effect of increasing the rotation speed of the brushless motor 62 is reduced. That is, the acceleration efficiency is favorable in the first aspect, as compared to the second aspect.

Meanwhile, also in the second aspect, time of section t6 can be obtained by calculation. An amount of change in current in section t6 is 2VM/3L from the previous current value Ia and U-phase voltage (VM×⅔). Accordingly, time T2 of section t6 is calculated with T2=3L×Ia/2VM. That is, when it is determined that time T2 has elapsed after S204, the motor driving unit 72 of the second aspect may proceed to S206. Meanwhile, also in the second aspect, the processing in which the table is used may be performed.

As described above in detail, according to the printer 100 of the second aspect, the counter-electromotive time period, which is a time period until the regenerative current becomes zero, is shortened and the cross point can be easily detected. Meanwhile, in the second aspect, also in the counter-electromotive time period (B), the switching element may be switched without waiting for the increase of the current value.

In the first aspect and the second aspect, the High-side switching elements 811 are turned ON for two phases except for a phase, which is in the non-energization time period, so that the other end of each coil of the stator 621 is set to the power supply voltage. However, for a phase in a direction in which the regenerative current flows, it is possible to enable the current to flow thereto via the freewheeling diode 812 even though the High-side switching element 811 is not turned ON. For example, upon the switching from U→W to V→W, the High-side switching element 811V of V-phase may be turned ON and the High-side switching element 811W and Low-side switching element 813W of W-phase may be turned OFF, as shown in FIG. 14.

Figure 14:
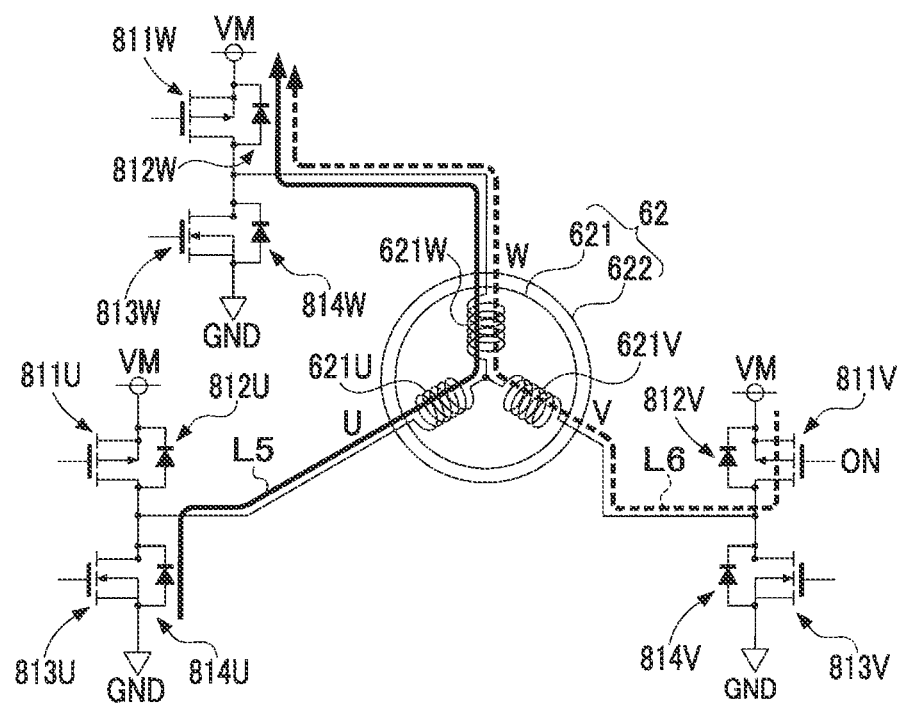
FIG. 14 illustrates an example of the current path.

Also in this configuration, the other end of W-phase becomes the power supply voltage, and the regenerative current flows via the freewheeling diode 812W, as shown in FIG. 14. Accordingly, it is possible to shorten the counter-electromotive time period. The switching element is not turned ON, so that the regenerative current flows via the freewheeling diode. Therefore, the power consumption is high and the regenerative current can be caused to become zero earlier. In the meantime, according to the first aspect and the second aspect, since the current is not caused to flow via the freewheeling diode, the heat is more difficult to be generated and the electrical efficiency is higher, as compared to a configuration where the current is caused to flow via the freewheeling diode.

In the meantime, the determination as to whether to execute the counter-electromotive shortening processing is not limited to the determination based on the comparison of the rotation speed and the speed threshold value in S104 of the motor acceleration processing. For example, the determination may be performed based on the current value of the current flowing through each coil of the stator 621. That is, instead of the processing of S104, the motor driving unit 72 may determine whether the current value immediately before switching the energization state is equal to or greater than a reference value, and may execute the counter-electromotive shortening processing in a case where it is determined that the current value is equal to or greater than the reference value. In a case where the current value of the current flowing through each coil is small, the counter-electromotive time period is short, and a possibility that the cross point can be acquired is high. On the other hand, in a case where the current value is large, since a possibility that the counter-electromotive time period is long is high, the counter-electromotive shortening processing is preferably executed to shorten the counter-electromotive time period.

Also, instead of the processing of S104, the motor driving unit 72 may determine whether it is the acceleration time period of the rotor 622, and may execute the counter-electromotive shortening processing in a case where it is determined that it is the acceleration time period of the rotor 622. During the acceleration time period of the rotor 622, a large current value is used. For this reason, the counter-electromotive time period tends to be lengthened, so that the counter-electromotive shortening processing is favorably used.

In the meantime, the illustrative embodiments are just exemplary and do not limit the present disclosure. Therefore, the present disclosure can be improved and modified in diverse forms without departing from the spirit thereof. For example, the present disclosure can be applied to any apparatus having a brushless motor device such as a copier, a FAX apparatus and the like, without being limited to the printer.

Also, the processing disclosed in the illustrative embodiments may be executed by the hardware such as a single CPU, a plurality of CPUs, an ASIC and the like or a combination thereof. Also, the processing disclosed in the illustrative embodiments can be implemented in a variety of aspects such as a storage medium having a program for executing the processing stored therein, a method and the like.

What is claimed is:

1. A brushless motor device comprising:
    a brushless motor including:
        a rotor having a magnetic pole;
        a stator including a first coil, a second coil and a third coil, first ends of the first coil, the second coil, and the third coil being Y-connected to each other; and
    a motor driver configured to drive the brushless motor, the motor driver including an inverter circuit including:
        first switching elements respectively arranged between second ends of the first coil, the second coil, and the third coil and a power supply voltage; and
        second switching elements respectively arranged between the second ends of the first coil, the second coil, and the third coil and a ground voltage; and
    wherein the motor driver is configured to switch ON and OFF states of each switching element of the inverter circuit,
    wherein by switching the ON and OFF states of each switching element of the inverter circuit, the motor driver is configured to switch an energization time period from a first time period in which current is caused to flow from the first coil to the third coil to a second time period in which current is caused to flow from the second coil to the third coil, and the motor driver is configured to set both voltages of the second ends of the second coil and the third coil to the power supply voltage during the second time period.

2. The brushless motor device according to claim 1, wherein the motor driver is configured to set both voltages of the second ends of the second coil and the third coil to the power supply voltage during the second time period in a case where the current flowing through the second coil becomes a threshold value or greater during the second time period.

3. The brushless motor device according to claim 1, wherein the motor driver is configured to set both voltages of the second ends of the second coil and the third coil to the power supply voltage at a timing in which the energization time period is switched from the first time period to the second time period.

4. The brushless motor device according to claim 1, wherein, after setting both voltages of the second ends of the second coil and the third coil to the power supply voltage during the second time period, the motor driver is configured to stop applying the power supply voltage to the second ends of the second coil and the third coil in a case where a voltage of the second end of the first coil becomes a predetermined voltage equal to or higher than 0V.

5. The brushless motor device according to claim 1, wherein the motor driver is further configured to:
    acquire a time period during which a counter-electromotive voltage is generated in the coil based on an upper limit of the current caused to flow through each coil of the stator, and
    after setting both voltages of the second ends of the second coil and the third coil to the power supply voltage during the second time period, stop applying the power supply voltage to the second ends of the second coil and the third coil after the time period during which the counter-electromotive voltage is generated in the coil has elapsed from a start of the second time period.

6. The brushless motor device according to claim 1, wherein the motor driver is configured to set both voltages of the second ends of the second coil and the third coil to the power supply voltage during the second time period in a case where a current value immediately before an end of the first time period is equal to or greater than a reference value.

7. The brushless motor device according to claim 1, wherein the motor driver is configured to set both voltages of the second ends of the second coil and the third coil to the power supply voltage during the second time period during an acceleration time period of the rotor.

8. The brushless motor device according to claim 1, wherein the motor driver is configured to set both voltages of the second ends of the second coil and the third coil to the power supply voltage during the second time period in which a rotation speed of the rotor is equal to or higher than a speed threshold value.

9. The brushless motor device according to claim 1, wherein the motor driver is configured to not turn the first switching element arranged between the third coil and the power supply voltage to the ON state when both voltages of the second ends of the second coil and the third coil are set to the power supply voltage during the second time period.

10. The brushless motor device according to claim 1, wherein by switching the ON and OFF states of each switching element of the inverter circuit, the motor driver is configured to switch the energization time period from a third time period in which current is caused to flow from the third coil to the first coil to a fourth time period in which current is caused to flow from the third coil to the second coil, and the motor driver is configured to set both voltages of the second coil and the third coil to the ground voltage during the fourth time period.

11. The brushless motor device according to claim 1, wherein, when both voltages of the second ends of the second coil and the third coil are set to the power supply voltage during the second time period,
the first switching element arranged between the second end of the first coil and the power supply voltage is set to the OFF state,
the first switching element arranged between the second end of the second coil and the power supply voltage is set to the ON state,
the first switching element arranged between the second end of the third coil and the power supply voltage is set to the ON state, and
all of the second switching elements are set to the OFF state.

12. An image forming apparatus comprising:
a light source configured to emit a light beam;
a mirror configured to deflect the light beam;
a brushless motor device configured to rotate the mirror, and
a control device,
wherein the brushless motor device includes:
    a rotor having a magnetic pole and configured to rotate integrally with the mirror;
    a stator including a first coil, a second coil and a third coil, first ends of the first coil, the second coil, and the third coil being Y-connected to each other; and
    an inverter circuit including:
        first switching elements respectively arranged between second ends of the first coil, the second coil, and the third coil and a power supply voltage; and
        second switching elements respectively arranged between the second ends of the first coil, the second coil, and the third coil and a ground voltage,
wherein the control device is configured to: switch ON and OFF states of each switching element of the inverter circuit, and
wherein by switching the ON and OFF states of each switching element of the inverter circuit, the control device is configured to switch an energization time period from a first time period in which current is caused to flow from the first coil to the third coil to a second time period in which current is caused to flow from the second coil to the third coil, and the control device is configured to set both voltages of the second ends of the second coil and the third coil to the power supply voltage during the second time period.

13. A control method for controlling a brushless motor device, the brushless motor device including: a rotor having a magnetic pole; a stator including a first coil, a second coil and a third coil, first ends of the first coil, the second coil, and the third coil being Y-connected to each other; and an inverter circuit including: first switching elements respectively arranged between second ends of the first coil, the second coil, and the third coil and a power supply voltage; and second switching elements respectively arranged between the second ends of the first coil, the second coil, and the third coil and a ground voltage; the method comprising:
    switching ON and OFF states of each switching element of the inverter circuit, and
    wherein by switching the ON and OFF states of each switching element of the inverter circuit, an energization time period is switched from a first time period in which current is caused to flow from the first coil to the third coil to a second time period in which current is caused to flow from the second coil to the third coil, and both voltages of the second ends of the second coil and the third coil are set to the power supply voltage during the second time period.

* * * * *